(12) United States Patent
Newton et al.

(10) Patent No.: US 7,814,931 B2
(45) Date of Patent: Oct. 19, 2010

(54) SELECTIVELY ACTUATED CONSTANT FLOW VALVE

(75) Inventors: John R. Newton, Vero Beach, FL (US); Peter J. Brooke, Micco, FL (US)

(73) Assignee: Global Agricultural Technology and Engineering, LLC, Vero Beach, FL (US)

( * ) Notice: Subject to any disclaimer, the term of this patent is extended or adjusted under 35 U.S.C. 154(b) by 460 days.

(21) Appl. No.: 11/851,505

(22) Filed: Sep. 7, 2007

(65) Prior Publication Data

US 2008/0011365 A1    Jan. 17, 2008

Related U.S. Application Data

(63) Continuation-in-part of application No. 11/769,315, filed on Jun. 27, 2007, now abandoned, and a continuation-in-part of application No. 11/481,194, filed on Aug. 20, 2007, now abandoned.

(60) Provisional application No. 60/830,265, filed on Jul. 12, 2006, provisional application No. 60/839,618, filed on Aug. 23, 2006, provisional application No. 60/888,621, filed on Feb. 7, 2007.

(51) Int. Cl.
*G05D 16/08* (2006.01)
(52) U.S. Cl. ............ 137/454.2; 137/495; 137/505.41
(58) Field of Classification Search ............ 137/66, 137/494, 495, 505.41, 454.2
See application file for complete search history.

(56) References Cited

U.S. PATENT DOCUMENTS

| | | | |
|---|---|---|---|
| 2,174,515 A | 10/1939 | Hughes | |
| 2,639,194 A | 5/1953 | Wahlinr | |
| 2,746,471 A * | 5/1956 | Cobb | ............ 137/505.41 |
| 2,833,304 A * | 5/1958 | Fish | ............ 137/495 |
| 2,960,109 A | 11/1960 | Wilson | |
| 3,229,714 A | 1/1966 | Raem | |
| 3,279,495 A * | 10/1966 | Taylor | ............ 137/454.6 |
| 3,424,196 A | 1/1969 | Donner | |
| 3,451,421 A * | 6/1969 | Vicenzi et al. | ............ 137/495 |
| 3,557,831 A | 1/1971 | Katchka | |
| 3,643,685 A | 2/1972 | Hays | |
| 3,730,215 A | 5/1973 | Conery et al. | |
| 3,746,036 A | 7/1973 | Du Bois et al. | |
| 3,782,410 A | 1/1974 | Steuby | |
| 3,872,884 A | 3/1975 | Busdiecker et al. | |
| 3,943,969 A | 3/1976 | Rubin et al. | |
| 3,948,285 A | 4/1976 | Flynn | |

(Continued)

FOREIGN PATENT DOCUMENTS

CA    530611    9/1956

(Continued)

*Primary Examiner*—Stephen Hepperle
(74) *Attorney, Agent, or Firm*—Gauthier & Connors LLP

(57) ABSTRACT

A constant flow regulating valve of the type described in U.S. Pat. Nos. 6,026,850 and 6,209,578 includes a closure mechanism configured and arranged to override the modulating mode of the valve and to close the valve at fluid inlet pressures both below and above the valve's threshold level. The closure mechanism may be selectively deactivated to thereby allow the valve to assume its normal pressure responsive regulating functions. Embodiments of the regulating valve incorporate pressure relief devices and vent seals, with configurations suitable for incorporation into the trigger assemblies of portable sprayers.

21 Claims, 8 Drawing Sheets

U.S. PATENT DOCUMENTS

| | | |
|---|---|---|
| 4,074,694 A | 2/1978 | Lee |
| 4,080,993 A | 3/1978 | Lind, Jr. |
| 4,083,380 A | 4/1978 | Huber |
| 4,197,995 A | 4/1980 | Campbell et al. |
| 4,250,915 A | 2/1981 | Rikuta |
| 4,275,764 A | 6/1981 | Baret |
| 4,416,301 A | 11/1983 | Brumm |
| 4,437,493 A | 3/1984 | Okuda et al. |
| 4,508,140 A | 4/1985 | Harrison |
| 4,513,777 A | 4/1985 | Wright |
| 4,516,600 A | 5/1985 | Sturman et al. |
| 4,621,658 A | 11/1986 | Buezis et al. |
| 4,627,832 A | 12/1986 | Hooven et al. |
| 4,630,642 A | 12/1986 | Detweiler |
| 4,657,224 A | 4/1987 | Lattuada |
| 4,697,613 A | 10/1987 | Wienck |
| 4,729,762 A | 3/1988 | Doumenis |
| 4,796,660 A | 1/1989 | Bron |
| 4,838,305 A | 6/1989 | Reinartz et al. |
| 4,852,606 A | 8/1989 | Heneker |
| 4,867,198 A | 9/1989 | Faust |
| 5,137,522 A | 8/1992 | Bron |
| 5,234,025 A | 8/1993 | Skoglund et al. |
| 5,241,986 A | 9/1993 | Yie |
| 5,255,711 A | 10/1993 | Reeds |
| 5,303,734 A | 4/1994 | Eidsmore |
| 5,341,968 A | 8/1994 | Vandoninck |
| 5,383,489 A | 1/1995 | Golestan et al. |
| 5,524,670 A | 6/1996 | Castle |
| 5,529,090 A | 6/1996 | Golestan et al. |
| 5,597,012 A | 1/1997 | Moinard |
| 5,642,752 A | 7/1997 | Yokota et al. |
| 5,727,529 A | 3/1998 | Tuckey |
| 5,829,477 A | 11/1998 | Graham et al. |
| 5,988,211 A | 11/1999 | Cornell |
| 6,026,850 A | 2/2000 | Newton et al. |

FOREIGN PATENT DOCUMENTS

| | | |
|---|---|---|
| DE | 3706579 | 6/1988 |
| EP | 0475743 | 3/1992 |
| GB | 732400 | 6/1955 |
| GB | 1163585 | 9/1969 |
| GB | 2006930 | 5/1979 |
| GB | 2099112 | 12/1982 |
| WO | WO2006/022455 | 3/2003 |
| WO | WO2006/101641 | 9/2006 |

* cited by examiner

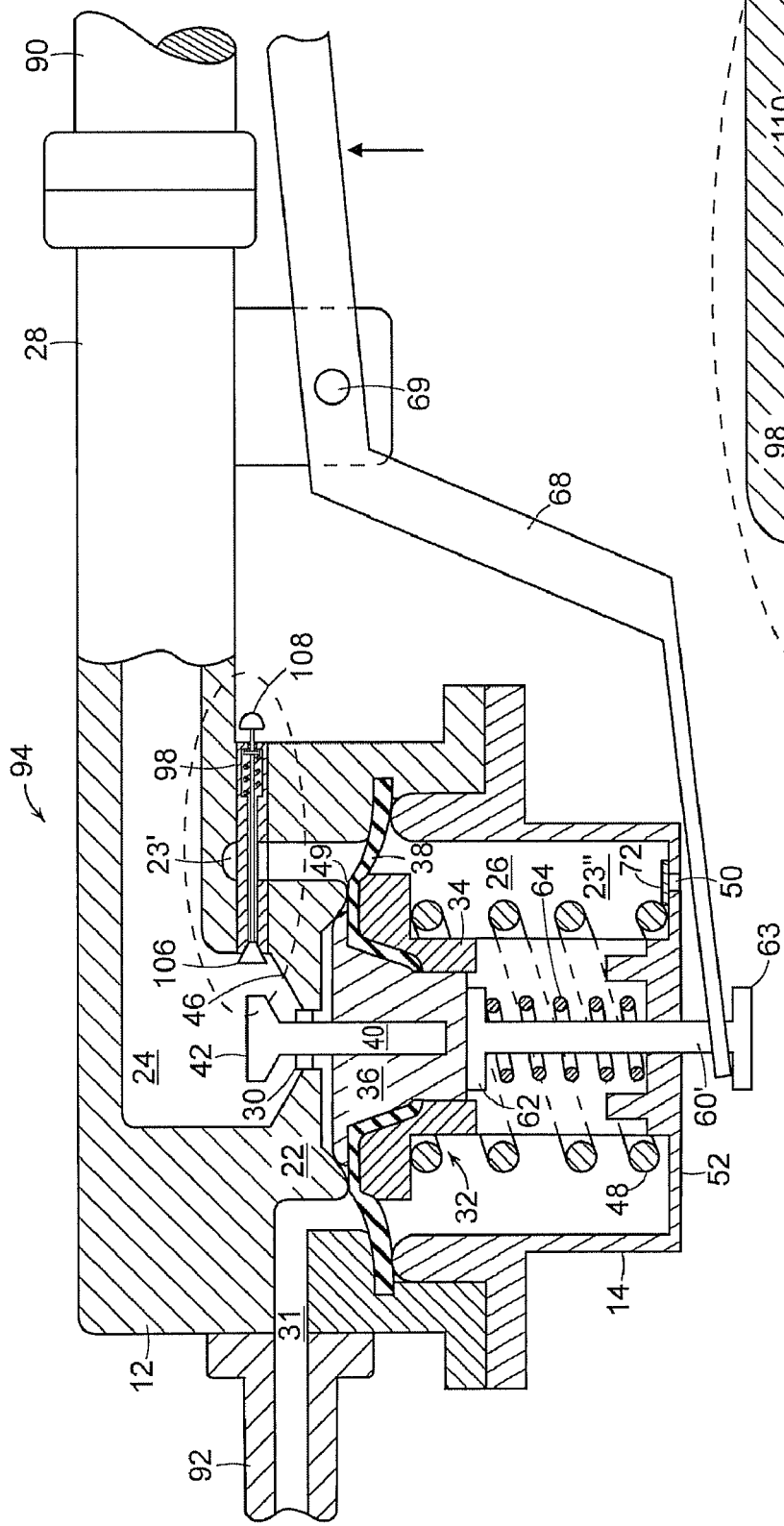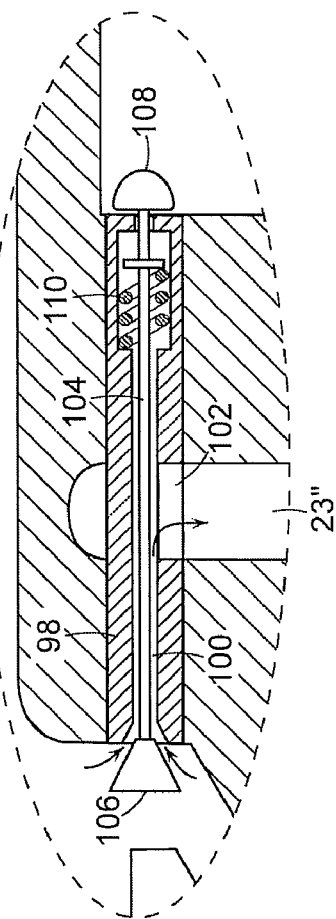

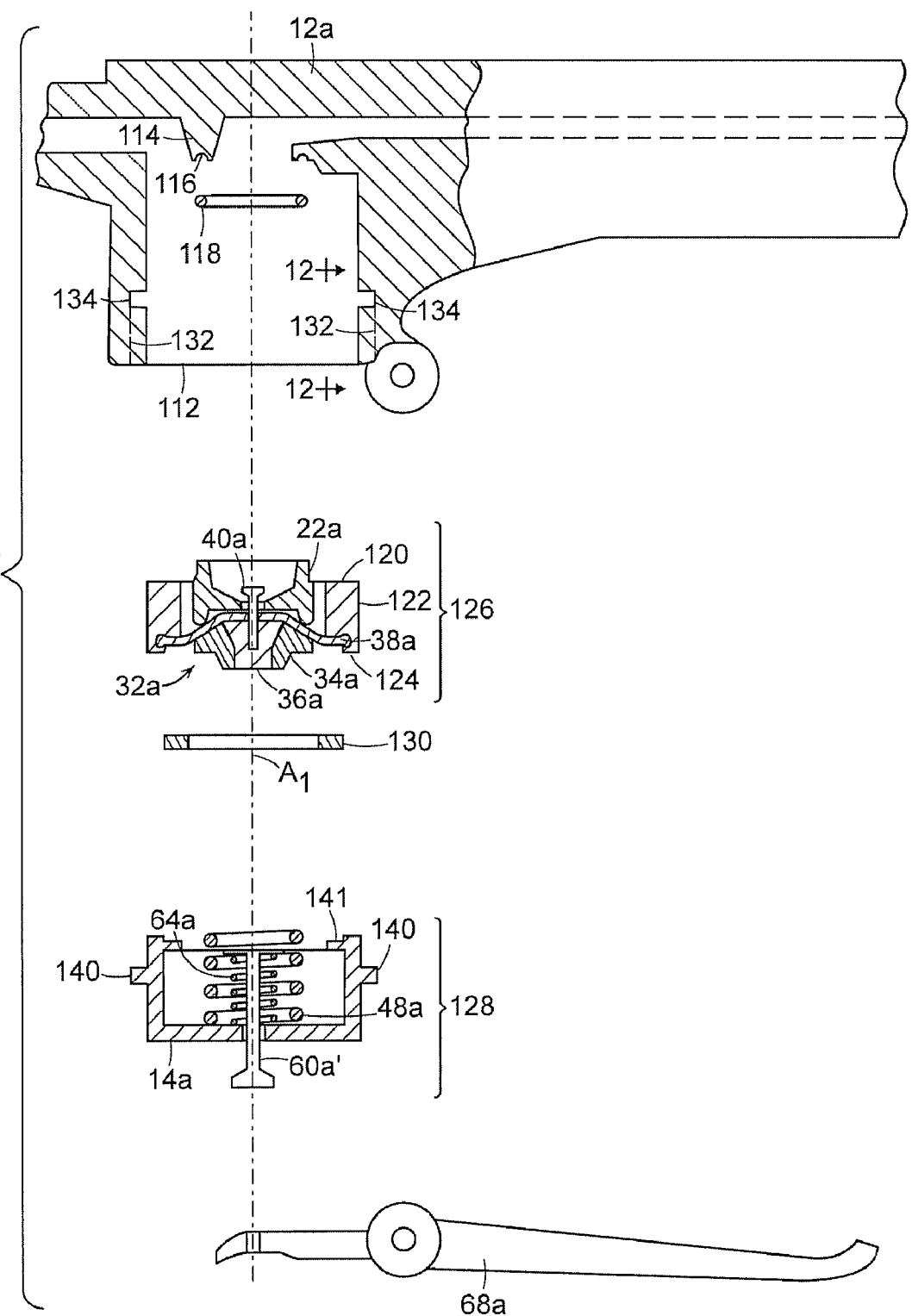

SELECTIVELY ACTUATED CONSTANT FLOW VALVE

CROSS REFERENCE TO RELATED APPLICATIONS

This application is a continuation-in-part of U.S. Ser. No. 11/769,315 filed Jun. 27, 2007 now abandoned, which claims priority from provisional Patent Application Ser. Nos. 60/830,265 and 60/839,618 filed respectively on Jul. 12, 2006 and Aug. 23, 2006, and from Ser. No. 11/841,194 filed Aug. 20, 2007 now abandoned. This application claims priority from provisional application Ser. No. 60/888,621 filed Feb. 7, 2007.

BACKGROUND OF THE INVENTION

1. Field of the Invention

This invention relates generally to fluid valves, and is concerned in particular with a regulating valve that operates in response to a variable fluid inlet pressure above a selected threshold level to deliver the fluid at a constant outlet pressure and flow rate. A closure mechanism is selectively operable either to accommodate the valve's normal pressure responsive regulating functions, or to override such functions by maintaining the valve in a closed state at inlet pressures both above and below the threshold level.

2. Description of the Prior Art

Examples of known regulating valves are described in U.S. Pat. Nos. 6,026,850 and 6,209,578. Such valves are normally closed in response to fluid inlet pressures below a threshold level, and operate in a modulating mode in response to variable fluid inlet pressures above the threshold level to deliver fluids at constant outlet pressures and flow rates. However, at fluid inlet pressures above the threshold level, such valves remain open and cannot serve as shut off valves, thus making it necessary to employ additional and separately operable valves to achieve this added function.

SUMMARY OF THE INVENTION

In accordance with one aspect of the present invention, the known regulating valves are modified to include closure mechanisms configured and arranged to override the modulating mode of the valves and to maintain closure of the valves at fluid inlet pressures both below and above the threshold level. The closure mechanisms may be selectively deactivated to thereby allow the valves to assume their normal pressure responsive regulating functions.

In accordance with still another aspect of the present invention, the vent opening communicating with the valve's spring chamber is provided with a seal which allows air to escape and enter the spring chamber, but which prevents the escape of liquid from the spring chamber in the event that the valve diaphragm is breached.

In accordance with another aspect of the present invention, a pressure relief mechanism is provided for relieving residual fluid inlet pressure below the threshold level when the valve is closed.

In accordance with another aspect of the present invention, multiple valve components are preassembled into integral subassemblies that are configured and arranged for final assembly into an outer housing structure.

In accordance with a further aspect of the present invention, the valve is integrated into the trigger assembly of a portable sprayer.

These and other features, aspects and attendant advantages of the present invention will now be described in further detail with reference to the accompanying drawings, wherein:

BRIEF DESCRIPTION OF THE DRAWINGS

FIG. 8 is an enlarged sectional view of the trigger assembly shown in FIG. 7;

FIG. 9 is an enlarged sectional view of the pressure relief mechanism shown in FIG. 8;

FIG. 11 is an exploded view of the components of the valve shown in FIG. 10;

DETAILED DESCRIPTION OF PREFERRED EMBODIMENTS

Figure 1:
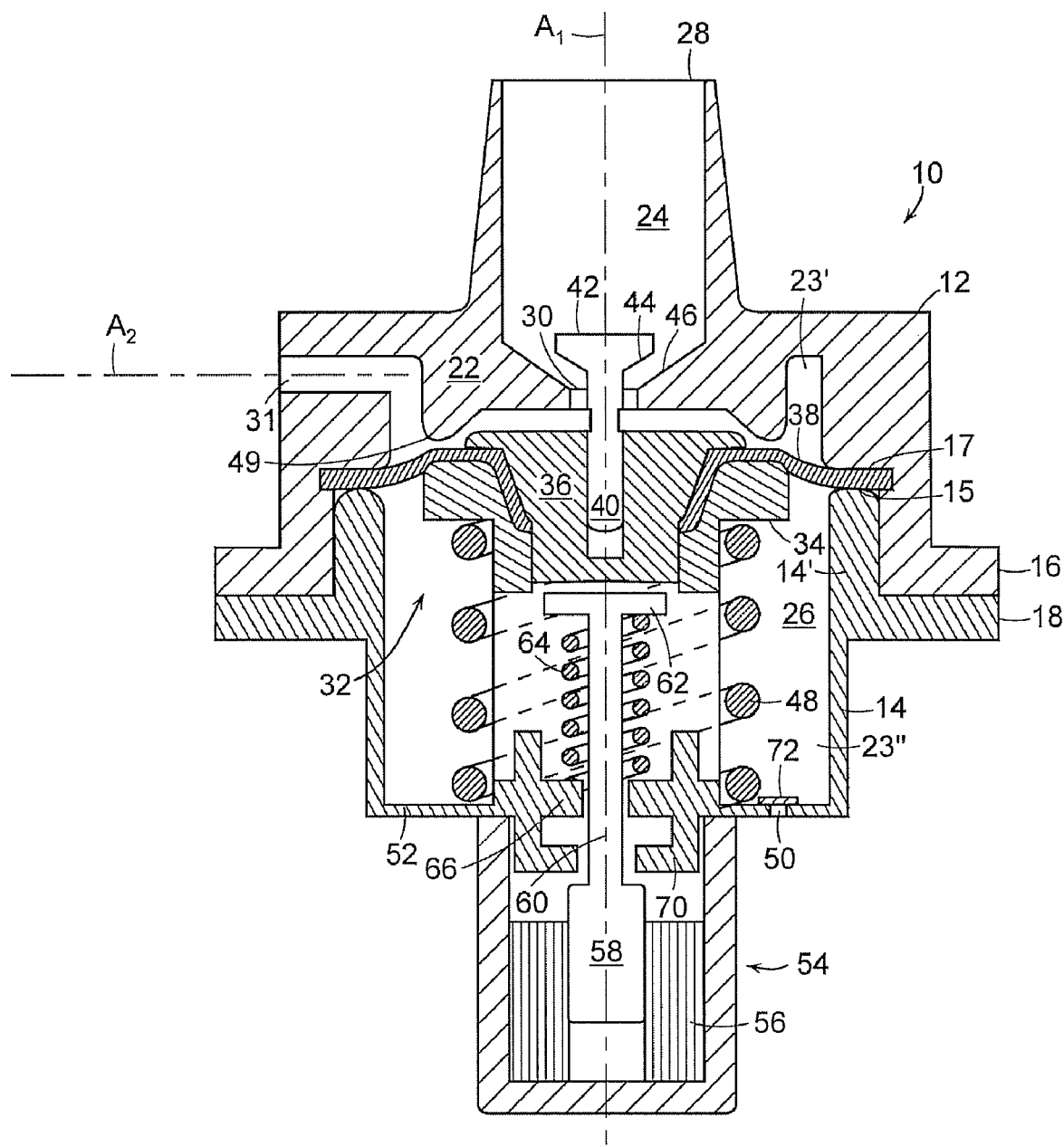
FIG. 1 is a sectional view through a regulating valve in accordance with one embodiment of the present invention, the valve being shown in its open condition.

With reference initially to FIG. 1, a regulating valve in accordance with the present invention is generally depicted at 10. The valve includes an outer housing having a cap 12 joined to a cup-shaped base 14 at mating exterior flanges 16, 18.

The housing is internally subdivided by a barrier wall 22 into a head section 24 and a base section 26. An inlet 28 in the cap 12 is adapted to be connected to a fluid supply (not shown) having a pressure that can vary from below to above a threshold level. The inlet 28 and a central port 30 in the barrier wall 22 are preferably aligned coaxially with a central axis $A_1$ of the valve. An outlet port 31 is provided in the cap 12, and may be aligned on a second axis $A_2$ transverse to the first axis $A_1$. Although the axis $A_2$ is shown at 90° with respect to axis $A_1$, it will be understood that axis $A_2$ may be oriented at other angles with respect to axis $A_1$ in order to suit various applications of the valve.

A modulating assembly 32 internally subdivides the base section into a fluid chamber 23' segregated from a spring chamber 23". The modulating assembly serves to prevent fluid flow through the valve when the fluid pressure at the inlet 28 is below the threshold pressure. When the fluid pressure at the inlet exceeds the threshold pressure, the modulating assembly serves to accommodate fluid flow from the head section 24 through port 30 into fluid chamber 23' and from there through outlet port 31 at a substantially constant outlet pressure and flow rate. Either the outlet port 31 or a downstream orifice or flow restrictor (not shown) serves to develop a back pressure in fluid chamber 23'.

The modulating assembly 32 includes a piston comprised of a hollow shell 34 and a central plug 36. The piston is supported for movement in opposite directions along axis $A_1$ by a flexible annular diaphragm 38. The inner periphery of the diaphragm is captured between the shell 34 and plug 36. The cup shaped base 14 has a cylindrical wall segment 14' received within the cap 12. The outer periphery of the diaphragm is captured between an upper rim 15 of the wall segment 14' and an inwardly projecting interior ledge 17 on the cap. The outer periphery of the diaphragm thus serves as an effective seal between the cap 12 and base 14.

A stem 40 on the piston plug 36 projects through the port 30 into the head section 24. An enlarged head 42 on the stem has a tapered underside 44 that coacts with a tapered surface 46 of the barrier wall to modulate the size of the flow path through the port 30 as an inverse function of the varying fluid pressure in the input section, with the result being to deliver fluid to the outlet 31 at a substantially constant pressure and flow rate.

A compression spring 48 in the spring chamber 23" is captured between an underside surface of shell 34 and the bottom wall 52 of the housing base 14. The spring urges the modulating assembly 32 towards the barrier wall 22. When the fluid inlet pressure is below the threshold pressure, spring 48 serves to urge the diaphragm 38 against a sealing ring 49 on the underside of the barrier wall 22, thus preventing fluid through flow from the head section 24 via port 30 and fluid chamber 23' to the outlet 31. As the fluid inlet pressure exceeds the threshold pressure, the resilient closure force of spring 48 is overcome, allowing the modulating assembly to move away from the sealing ring 49, and allowing the modulating function of the coacting tapered surfaces 44, 46 to commence. An opening 50 in the bottom wall 52 serves to vent the volume beneath diaphragm 38 to the surrounding atmosphere.

An operating means includes a solenoid 54 fitted to the underside of the cup-shaped base 14. The solenoid includes a magnet 56 surrounding a magnet core 58. A rod 60 projects from the magnet core along axis $A_1$ into the spring chamber 23" where it terminates in a flat head 62. A closure means includes a second compression spring 64 surrounding the rod 60 and captured between the head 62 and an annular interior boss 66 on the bottom wall 52 of the base 14. The closure force of spring 64 exceeds that of spring 48.

In the condition shown in the drawing, the magnet 56 has been energized to axially withdraw the core 58, thus pulling the head 62 downwardly against the compressive force of spring 64 and away from the underside of plug 34. This allows the modulating assembly 32 to perform its normal pressure regulating functions as described above.

If the magnet 56 is deenergized, the spring 64 will serve to push the head 62 up against the bottom of plug 34 with a closure force sufficient to override the valve's normal regulating functions, resulting in the diaphragm assembly 32 being elevated to press the diaphragm 38 against the circular downwardly projecting sealing ring 49 on the barrier wall 22. This in turn prevents fluid through flow from head section 24 via port 30 and fluid chamber 23' to the outlet port 31. A circular ledge 70 serves as a stop to limit upward movement of the core 58, thus safeguarding the diaphragm 38 from being pressed too tightly against the sealing ring 49. The closure force of spring 64 is sufficient to hold the diaphragm 38 against the sealing ring 49 at inlet pressures above the threshold pressure.

Figure 2:
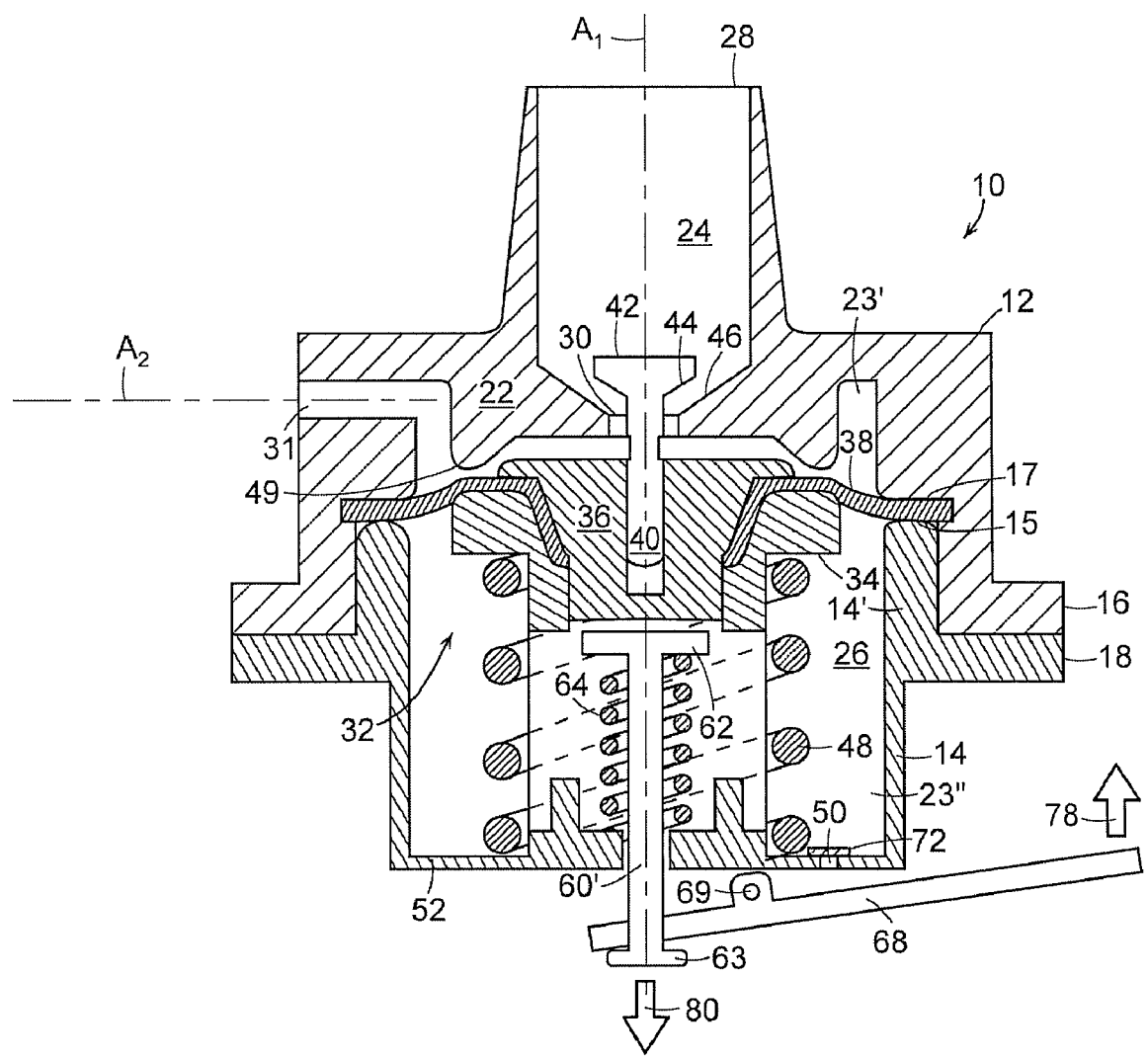
FIG. 2 is a sectional view through a second embodiment of a regulating valve in accordance with the present invention, the valve again being shown in its open condition.

In the alternative embodiment shown in FIG. 2, the rod 60' projects through the bottom wall 52 to terminate in a foot 63 acted upon by a lever 68 mounted for pivotal movement about a pin 69 or the like. Moving the lever up causes the rod 60' to be pulled downwardly.

In light of the foregoing, it will be seen that the valve 10 can serve as a shut off valve by simply allowing the spring 64 to override spring 48 and maintain the diaphragm 38 of the modulating assembly 32 in sealing contact with the ring 49 on barrier wall 22. By deactivating the closure force of spring 64, either by energizing the solenoid 54 of FIG. 1 or manually operating lever 68 of FIG. 2, the valve is conditioned to assume its normal pressure responsive regulating function at inlet pressures above the threshold level.

Figure 3:
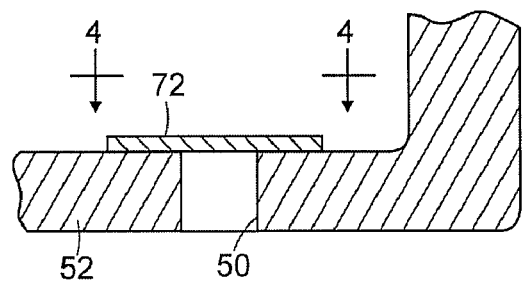
FIG. 3 is a sectional view on an enlarged scale taken through the vent seal shown in FIGS. 1 and 2.
Figure 4:
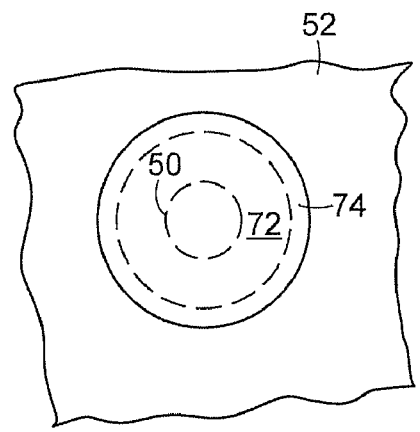
FIG. 4 is a plan view taken on line 4-4 of FIG. 3.

As can be best seen by additional reference to FIGS. 3 and 4, a gas permeable hydrophobic seal 72 overlies the vent opening 50. The seal may comprise an expanded polytetraflouroethelene (ePTFE) film, or any other gas permeable hydrophobic membrane that allows air to escape from and reenter the spring chamber 23", but that in event of failure of the diaphragm 38 and entry of liquid into the spring chamber, will prevent liquid from leaking to the exterior of the valve via the vent opening 50. The seal 72 may be adhered or heat sealed to the bottom wall 52 as at 74. Although not shown, the seal may be reinforced, if necessary, by an additional porous membrane, e.g., a woven fabric or the like.

Figure 5:
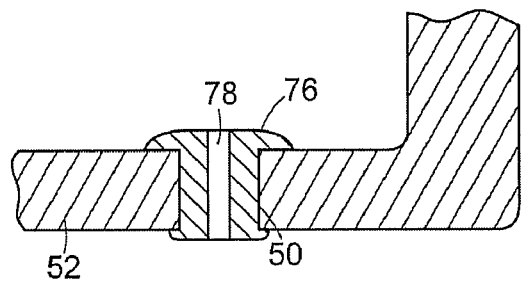
FIGS. 5 and 6 are sectional views through alternative embodiments of vent seals.

FIG. 5 depicts an alternative embodiment of the vent seal in which a bushing 76 has been snapfitted into the vent opening 50. The bushing is molded of a hydrophilic polymer that absorbs water and swells, resulting in closure of the restricted central vent passageway 78. This again serves to prevent leakage in the event of failure of the diaphragm 38.

Figure 6:
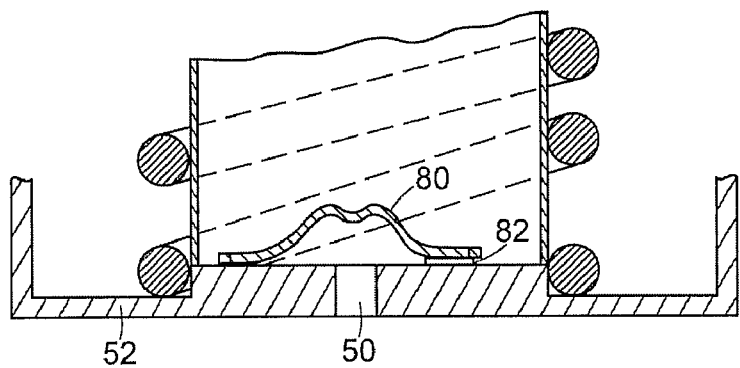

FIG. 6 depicts still another alternative embodiment of the vent seal in which the vent opening 50 is located at the center of bottom wall 52. A flexible sealing diaphragm 80 of some material that is impervious to both liquids and air is adhered or heat sealed as at 82 over the vent opening. As air pressure in the spring chamber 23" varies in response to flexure of the main diaphragm 38, the sealing diaphragm 80 will respond flexibly, while at all times maintaining a sealing relationship which will prevent liquid from escaping through the vent opening.

It thus will be seen that the seals 72, 76 and 80 serve as safeguards against leakage of liquid from the regulating valve through vent opening so in the event that the diaphragm 38 is breached.

The regulating valves of the present invention are adaptable to widespread usage, a non-limiting example being to stabilize the pressure and flow of the liquid sprays emitted by portable sprayers.

Portable sprayers include both knapsack sprayers and compression sprayers. In the conventional knapsack sprayer, a lever actuated pump is manually operated to withdraw liquid from a non-pressurized portable tank and to deliver the liquid through a wand to a nozzle from which the liquid is expelled in a spray pattern. In a compression sprayer, the tank is pressurized to achieve the same result. In both cases, the delivery pressure varies over a wide range, which affects the liquid spray pattern. Too little pressure produces excessively large wasteful spray droplets, whereas excessive pressure operates in the reverse manner to produce an overly atomized spray which can easily drift from the intended target.

Some attempt at control is provided by manually operating trigger assemblies interposed in the flow path between the tank and nozzle. However, experience has proven that operators are unable to operate such trigger assemblies in a manner which reliably produces substantially uniform delivery pressures and liquid flow rates to the spray nozzles. Thus, spray patterns remain erratic, resulting in wasteful excessive liquid application and/or inadequate overly atomized sprays which often drift dangerously from their intended targets.

Figure 7:
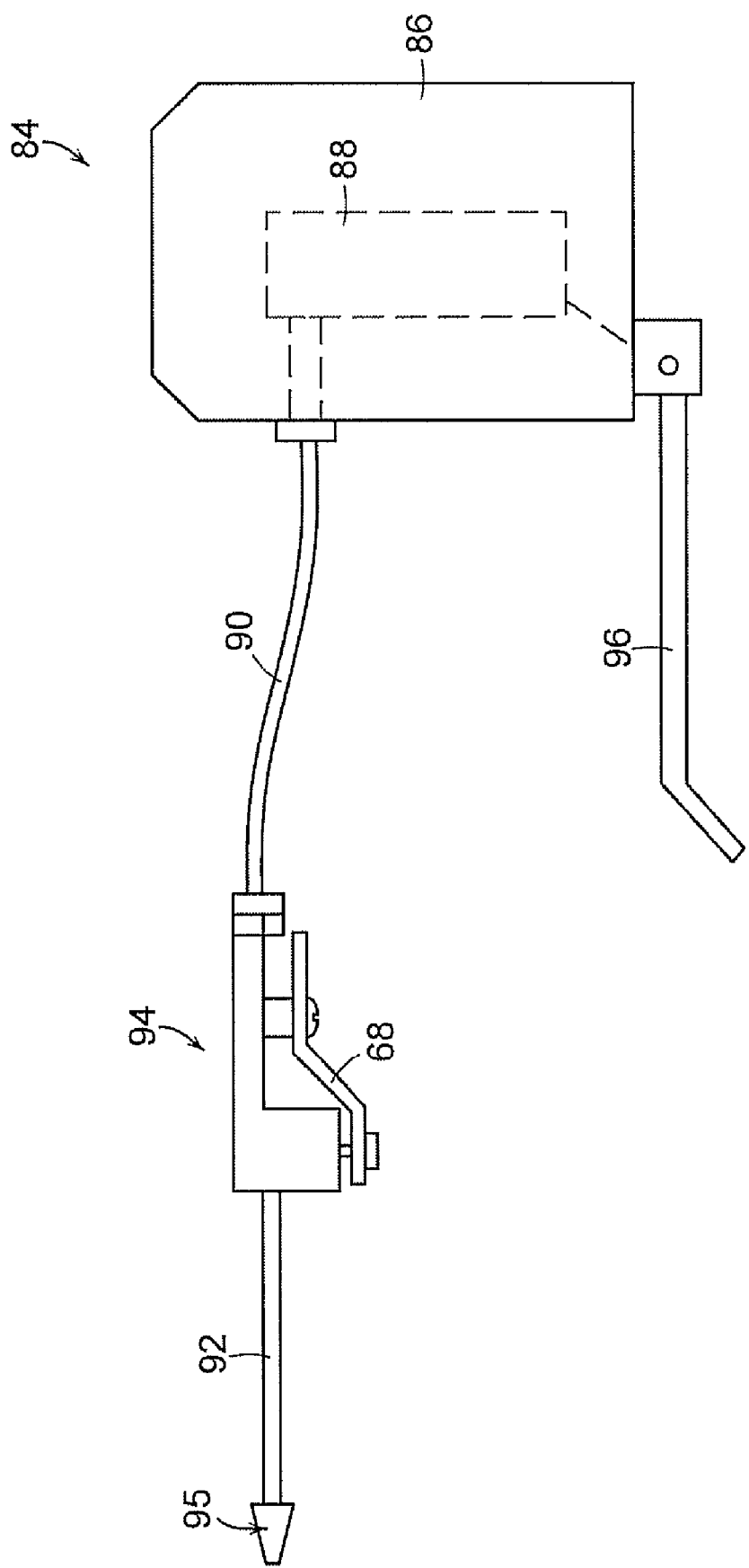
FIG. 7 is a schematic view of a portable sprayer with a trigger assembly incorporating a regulating valve in accordance with the present invention.

In order to address these problems, and with reference to FIGS. 7-9, a knapsack sprayer 84 includes a tank 86 adapted to contain a liquid, typically a pesticide, herbicide or the like. A pump 88 is mounted within the tank, with an inlet submerged in the liquid, and an outlet connected to a flexible hose 90 leading to trigger assembly 94 incorporating a selectively actuated regulating valve in accordance with the present invention. The trigger assembly 94 is in turn connected to a wand 92 having a nozzle 95 at its distal end. The pump 88 is operated by a pivotal lever 96 which is manually manipulated by an operator to withdraw liquid from the tank 86 and to deliver the liquid at a variable pressure via the hose 90 to the trigger assembly 94. Although not shown, it will be understood that the pressurized tank of a compression sprayer would operate in a similar manner to deliver fluid at a variable pressure.

The trigger assembly 94 incorporates a regulating valve similar to that illustrated in FIG. 2, with minor modifications to accommodate its positioning in the liquid flow path between the hose 90 and wand 92. For example, the head section 24 has been reconfigured with a 90° turn to position the inlet 28 for connection to the hose 90, the shape and pivotal connection of the operating lever 68 has been appropriately modified to serve as the trigger, and the outlet port has been connected to the wand 92.

The regulating valve of the trigger assembly 94 is held closed by the force of spring 64. The closure force of spring 64 is relieved by depressing the trigger 68, and in response to pump pressures above the preset threshold level, the valve operates as described previously to maintain a substantially constant delivery pressure and flow rate via the wand 92 to the nozzle 95. By maintaining a substantially constant pressure and flow rate to the nozzle 95, the selected spray pattern remains stable irrespective of variations in the pressure and flow rate of the liquid exiting tank 86.

The regulating valve of the trigger assembly 94 may be additionally modified to include pressure relief means for relieving residual internal pressures in the head section 24 when the valve is closed and either disassembly is required for cleaning and maintenance, or when the trigger assembly is disconnected from the hose 90. To this end, a sleeve 98 is inserted in the cap 12. The sleeve provides a vent path 100 extending from an entry opening communicating with the head section 24 to a side exit opening 102 communicating with the fluid chamber 23'. A pin 104 extends through the sleeve and terminates at opposite ends in enlarged shaped closure and operating heads 106, 108 located respectively in head section 24 and at the valve exterior. A spring 110 serves to bias the pin to the right as viewed in the drawings, thus pulling the closure head 106 in the same direction to close off the vent path 100, as shown in FIG. 8. The vent path is opened by depressing operating head 108 to shift pin in the opposite direction, as shown in FIG. 9, thus opening the vent path and allowing pressurized liquid in the head section 24 to be bled through opening 102 to the fluid chamber 23' from which it can exit through outlet port 31 to the wand 92.

Figure 10:
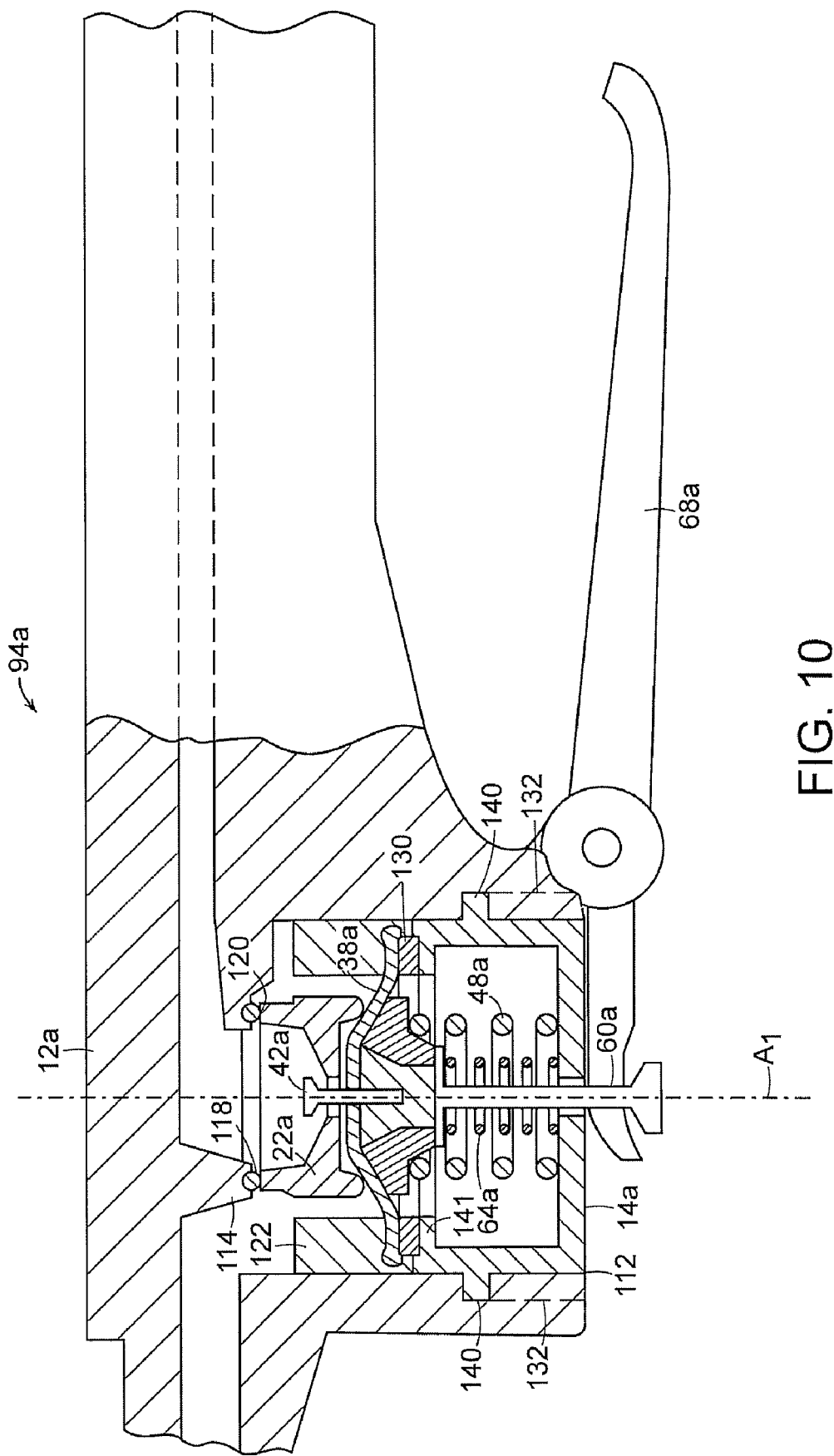
FIG. 10 is a sectional view of an alternative embodiment of a valve in accordance with the present invention.

With reference additionally to FIGS. 10 and 11, another embodiment of a regulating valve is accordance with the present invention is depicted at 94a. The components of valve 94a that are the same or equivalent to those of value 94 depicted in FIG. 8 have been identified with the same reference numerals with "a" as an added identify.

In this embodiment, the cap 12a serves as an outer housing structure. The cap 12a has a bottom opening 112 and an internal circular land 114 grooved to accept an O-ring seal 118. The bottom opening 112 and circular land 114 are aligned on a central axis $A_1$. The barrier wall 22a is separate from the cap 12a and has a circular rim 120 adapted to be seated in sealing engagement against the O-ring seal 118.

The modulating assembly 32a again includes a piston comprised of a hollow shell 34a and a central plug 36a. The piston is supported for movement along axis $A_1$, by a flexible diaphragm 38a. The inner periphery of the diaphragm is captured between the shell 34a and plug 36a, and the outer periphery of the diaphragm has a beaded edge captured in an internal groove in a cylindrical skirt 122 having a circular bottom edge 124.

A preassembled first subassembly 126 includes the shell 34a, central plug 36a, diaphragm 38a, skirt 122, barrier wall 22a and the stem 40a.

A preassembled second subassembly 128 includes the cup-shaped base 14a, compression springs 48a and 64a, and the operating rod 60a.

The valve 94a is assembled by first seating the O-ring seal 118 in the groove 116 of the interior land 114. The first subassembly 126 is then inserted through bottom opening 112 of the cap to seat its rim 120 against the O-ring seal 118.

A compressible annular seal 130 is then inserted via opening 112 and located against the bottom of the diaphragm 38a.

Figure 12:
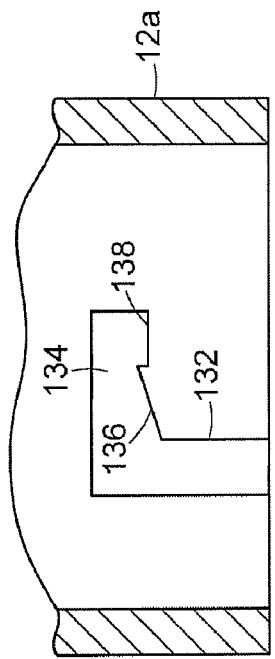
FIG. 12 is a partial elevational view taken on line 12-12 of FIG. 11.

The second subassembly 128 is then inserted through bottom opening 112. As shown in FIG. 12, the interior wall of the cap 12a is provided with oppositely disposed vertical grooves 132 leading to horizontal grooves 134. The grooves 134 have ramped bottoms 136 leading to notches 138. The cup-shaped base 14a has oppositely disposed radially projecting ears 140.

Figure 13C:
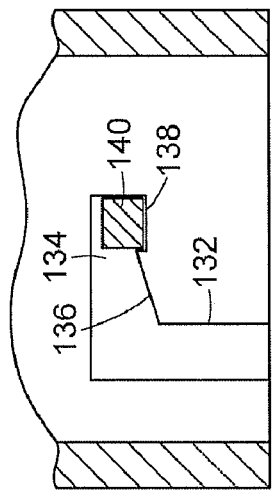
FIGS. 13A-13C are sequential views similar to FIG. 12 illustrating snap engagement of the cup-shaped base within the cap of the regulating valve shown in FIGS. 10 and 11.
Figure 13B:
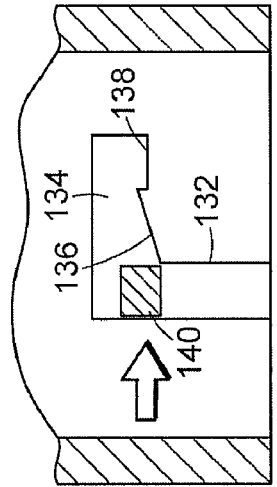
Figure 13A:
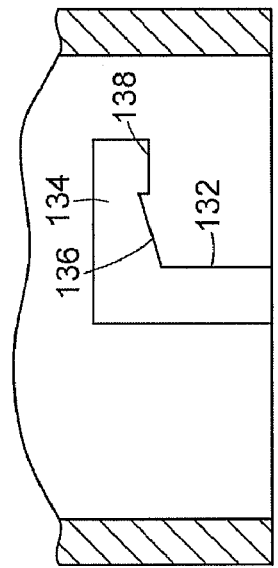

As the second subassembly 128 is inserted, the ears 140 of the cup-shaped base 14a enter the vertical slots 132 (FIG. 13A). When an internal ledge 141 adjacent to the upper rim of the cup-shaped base 14a initially contacts the seal 130, the ears 140 are positioned as shown in FIG. 13B. The cup-shaped base is then rotated to shift the ears up the ramped bottoms 136 and into snapped engagement in the notches 136, as shown in FIG. 13C. The second subassembly is then securely locked in place, with the seal 130 compressed between the underside of the diaphragm 38a and the ledge 141.

The trigger 68a may then be operatively connected to the cap 12a and rod 60a' to complete the assembly.

It will be understood that the second subassembly 128 may be secured in place by other means, including for example solvent welding or a threaded connection. Preassembly of the first and second subassemblies advantageously simplifies final assembly of the regulating valves.

What is claimed is:

1. A regulating valve for receiving fluid at a variable inlet pressure from a fluid source and for delivering said fluid at a substantially constant outlet pressure and flow rate to a fluid applicator or the like, said valve comprising:

a housing internally subdivided by a barrier wall into a head section and a base section;

a port in said barrier wall;

a modulating assembly internally subdividing said base section into a fluid chamber and a spring chamber, said modulating assembly having a stem projecting along an axis through said port into said head section, and having a flexible diaphragm supporting said modulating assembly for movement in opposite directions along said axis;

an inlet in said housing for connecting said head section to said fluid source;

an outlet in said housing communicating with said fluid chamber;

a spring in said spring chamber, said spring being responsive to inlet pressures below a threshold level to maintain said modulating assembly against said barrier wall and to thereby prevent fluid through flow from said head section via said port and fluid chamber to said outlet, said spring being yieldably responsive to inlet pressures above said threshold level to thereby accommodate movement of said modulating assembly away from said barrier wall, with an accompanying fluid through flow from said head section via said port and said fluid chamber to said outlet, and with said stem serving to modulate the size of the flow path through said port as an inverse function of variations in said inlet pressure above said threshold level, whereby said outlet pressure and flow rate is maintained at a substantially constant level;

closure means acting independently of said spring, said closure means comprising a rod axially movable between a holding position in contact with and maintaining said modulating assembly against said barrier wall when said inlet pressure is both above and below said threshold level, and a deactivated position spaced from said modulating assembly; and operating means for selectively deactivating said closure means.

2. The regulating valve of claim 1 wherein said rod is aligned with and axially movable along said axis.

3. The regulating valve of claim 1 or 2 wherein said rod is resiliently maintained in said holding position by a second spring having a closure force exceeding the closure force of said first mentioned spring.

4. The regulating valve of claim 3 wherein said operating means comprises a manually operable lever operatively connected to said rod.

5. The regulating valve of claim 3 wherein said operating means comprises a solenoid.

6. The regulating valve of claim 1 wherein said closure means comprises a second spring having a closure force that exceeds the closure force of said first mentioned spring.

7. The regulating valve of claim 1 wherein said fluid source is a portable sprayer, and wherein said outlet is connected to a wand leading to a nozzle.

8. The regulating valve of claim 7 wherein said portable sprayer is a knapsack sprayer.

9. The regulating valve of claim 7 wherein said portable sprayer is a compression sprayer.

10. The regulating valve of claim 1 or 7 further comprising pressure relief means for bleeding liquid from said head section into said fluid chamber.

11. The regulating valve of claim 10 wherein said pressure relief means comprises a vent path extending from an entry opening communicating with said head section to an exit opening communicating with said fluid chamber, a pin having a closure head in said head section and an operating head located externally of said housing, and a spring for biasing said pin into a closed position at which said closure head closes said entry opening and prevents the passage of liquid from said head section via said vent path to said fluid chamber, said operating head being depressible to overcome the biasing force of said spring to thereby permit liquid to flow from said head section via said vent path to said fluid chamber.

12. The regulating valve of claim 1 wherein said housing comprises a cap and a cup-shaped base, said barrier wall and said modulating assembly being preassembled to form a first subassembly received in said cap, and said cup-shaped base and said spring and closure means being preassembled to form a second subassembly received in and operatively coupled to said cap.

13. The regulating valve of claim 12, wherein said second subassembly is operatively coupled by snap engagement of said cup-shaped base with said cap.

14. The regulating valve of claim 13 wherein said snap engagement results from rotation of said cup-shaped base relative to said cap.

15. The regulating valve of claim 1 further comprising a vent opening in said housing in communication with said spring chamber.

16. The regulating valve of claim 15 further comprising a seal for said vent opening, said seal being adapted to accommodate passage of gas through said vent opening and to prevent the passage of liquid through said vent opening.

17. The regulating valve of claim 16 wherein said seal comprises a gas permeable hydrophobic membrane.

18. The regulating valve of claim 16 wherein said seal comprises a hydrophobic bushing inserted in said vent opening, said bushing defining a restricted vent passageway that is closed in response to the absorption of liquid by said bushing.

19. The regulating valve of claim 16 wherein said seal comprises a flexible diaphragm imperious to both liquids and gases.

20. A regulating valve for receiving fluid at a variable inlet pressure from a fluid source and for delivering said fluid at a substantially constant outlet pressure and flow rate to a fluid applicator or the like, said valve comprising:

a housing internally subdivided by a barrier wall into a head section and a base section;

a port in said barrier wall;

a modulating assembly internally subdividing said base section into a fluid chamber and a spring chamber, said modulating assembly having a stem projecting along an axis through said port into said head section, and having a flexible diaphragm supporting said modulating assembly for movement in opposite directions along said axis;

an inlet in said housing for connecting said head section to said fluid source;

an outlet in said housing communicating with said fluid chamber;

a spring in said spring chamber, said spring being responsive to inlet pressures below a threshold level to maintain said modulating assembly against said barrier wall and to thereby prevent fluid through flow from said head section via said port and fluid chamber to said outlet, said spring being yieldably responsive to inlet pressures above said threshold level to thereby accommodate movement of said modulating assembly away from said barrier wall, with an accompanying fluid through flow from said head section via said port and said fluid chamber to said outlet, and with said stem serving to modulate the size of the flow path through said port as an inverse function of variations in said inlet pressure above said threshold level, whereby said outlet pressure and flow rate is maintained at a substantially constant level, and wherein said housing comprises a cap and a cup-shaped base, said barrier wall and said modulating assembly comprises a first preassembled subassembly adapted to be received in said cap, and said cup-shaped base and said spring comprise a second preassembled subassembly adapted to be received in and operatively coupled to said cap.

21. The regulating valve of claim 20 further comprising closure means acting independently of said spring for maintaining said modulating assembly against said barrier wall when said inlet pressure is both above and below said threshold level, and operating means for selectively activating said closure means.

* * * * *